Aug. 9, 1966 G. R. OBENSHAIN 3,265,520

METHOD OF DECORATING GLASS BOTTLES

Filed Aug. 29, 1962

INVENTOR.
GEORGE R. OBENSHAIN
BY J. R. Nelson and
W. A. Schaich
ATTORNEYS

United States Patent Office 3,265,520
Patented August 9, 1966

3,265,520
METHOD OF DECORATING GLASS BOTTLES
George R. Obenshain, Sylvania, Ohio, assignor to Owens-Illinois Inc., a corporation of Ohio
Filed Aug. 29, 1962, Ser. No. 220,173
4 Claims. (Cl. 117—8)

The present invention relates to a novel method of decorating and being particularly applicable to the decoration of glass articles. Even more particularly, the present invention relates to a method of decoration as herein described wherein the decoration applied to a glass substrate is of longer life than known heretofore.

The invention relates most particularly to the utilization of certain brilliant metal coatings which form a metallic film when applied to various glass substrate surfaces and then subsequently heated. These latter precious metal coatings, as well as others, are frequently short-lived due to the fact that the depositing of the coating by stencil, brushing, spraying, or the like, result in a raised coating of the decorating material. By raised, I mean elevated with respect to the normal plane or surface of the glass article, whether it be flat or convex as in the case of cylindrical articles, e.g. bottles, tumblers, and the like. Such raised or elevated coatings are obviously subject to deleterious wear in handling or rubbing against other articles on the shelf, in shipment, or the like. More frequently, the raised decoration becomes chipped off, resulting in a very unsightly article. Recourse has been had to various protective coatings to avoid the short-lived character of these precious metal decorating coatings, but with little or no effective success. Recourse also has been had to the depositing of multiple coatings of decorative materials in an effort to improve the bond of the precious metal coating to the substrate. Success has been less than desirable, unfortunately.

It is, accordingly, an object of the present invention to provide a method of decorating which generally overcomes the above-enumerated difficulties, and thereby provides a more permanent and protected applied precious metal coating decoration.

It is also an object of the present invention to provide a method which includes a novel sequence of steps defining a unitary operation which steps collectively result in a decoration which is visibly distinctive and long-lived as compared to decorations, particularly of the precious metal coating decorations known heretofore.

It is still another object of the present invention to provide a method of the type described, which method is capable of being carried out in conventional facilities, utilizing certain readily available apparatus, and without any elaborate innovations which might otherwise interfere with the adoption of the method in accordance with this invention.

It is a principal object of the present invention to provide a method of decorating glass articles wherein the decoration is applied to recessed portions formed in the glass as well as contiguous areas followed by drying, selective removal and final bonding procedures, thereby yielding an article of permanent decorative character.

It is also an object of the present invention to provide a decorated article, particularly of glass, which is capable of being exposed to handling and the like without encountering serious damage to the applied decoration.

The foregoing objects, as well as many others, will become apparent to those skilled in the art from the following detailed description taken in conjunction with the annexed sheet of drawings on which there is presented, for the purposes of illustration only, a single embodiment of the present invention.

In its simplest form, the present invention contemplates the application of the desired decorating coating into recessed areas formed in the glass article, said areas defining any desired or suitable decorative design and/or lettering, and also to areas immediately contiguous to the recessed areas to insure complete coverage of the recessed areas, heating said glass article containing the applied decorating coating to a temperature sufficient to dry the decorating coating, but at a temperature lower than that which would cause the coating decoration to permanently bond or fuse to the glass, thence selectively removing the dried decorating coating from the contiguous areas and thereafter again heating said glass article to a temperature that is sufficient to bond or fuse the decorating coating to the glass substrate.

Figure 1:
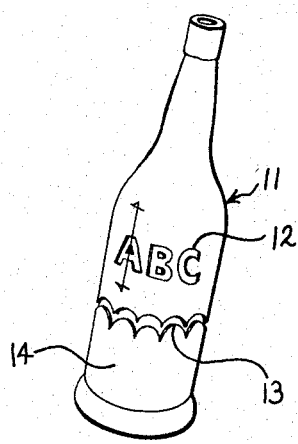
FIG. 1 is a perspective view of a bottle formed of glass and bearing a decoration in the form of a design, and additionally bearing lettering.

Referring now more specifically to the drawings, there is disclosed in FIG. 1 a bottle 11 formed of glass and bearing decorations in the form of recessed lettering "A B C," identified by the reference numeral 12, and a design in the form of a scalloped peripheral band 13, which is recessed with respect to the normal cylindrical surface 14 of the bottle.

Figure 2:
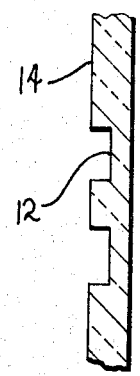
FIG. 2 is a sectional view taken on the line 2—2 of FIG. 1.
Figure 3:
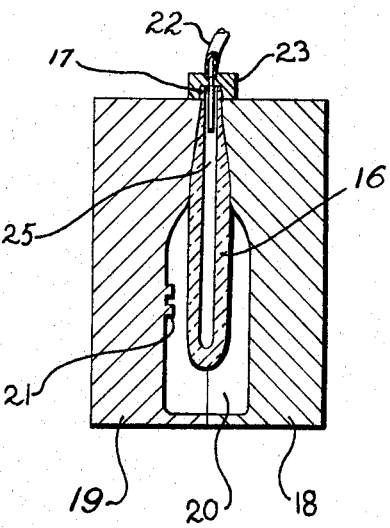
FIG. 3 is a schematic, partly sectional, view of a glass forming operation illustrating one step in accordance with a preferred embodiment of the process of this invention.

FIG. 3 schematically illustrates one method for forming the recessed areas, in the form of lettering or a design, in the glass article, in this case a bottle. Thus, FIG. 3 discloses a preformed glass parison 16, which is suspended between a pair of mold halves 18 and 19 with its neck portion 17 projecting thereabove. The mold halves together define a cavity 20 of the ultimate bottle contour and the mold half 19 includes projections 21 in the form of the desired lettering or band design. Line 22 delivers ample air pressure to "blow" head 23 which is in pressure sealed communication with the neck portion and the axially extending bore 24 within the parison. The air pressure within the bore 24 causes the parison to expand or "blow" outwardly to fill the cavity 20 and thus bear against the projection 21 whereby the recessed areas 12 are formed, as shown greatly enlarged in FIG. 2.

Figure 4:
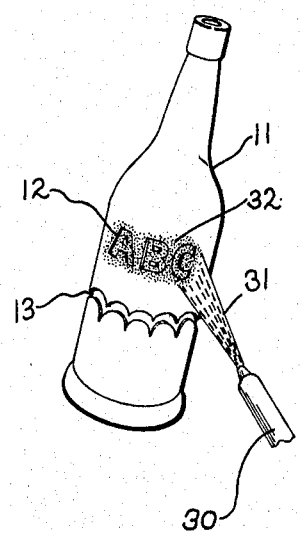
FIG. 4 is a perspective view like FIG. 1, but showing an intermediate step in the carrying out of the process of the present invention.
Figure 5:
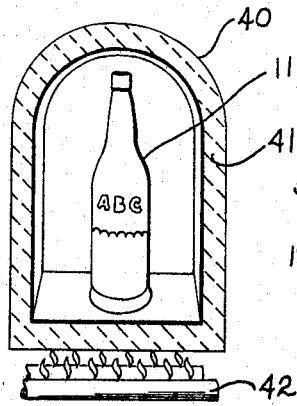
FIG. 5 is a schematic sectional view of apparatus used in several steps of the process of the present invention.

Referring now to FIG. 4, there is disclosed the bottle 11 as in FIG. 1 bearing the recessed lettering "A B C," identified by the reference numeral 12, and a recessed scalloped decoration band 13. A spray gun 30 issues a spray of a precious metal decorating composition 31 onto the recessed area 12 and also the area 32 immediately contiguous thereto. This insures an ample and complete coverage of the recessed areas. Referring now to FIG. 5, there is shown a kiln 40 having insulating material 41 thereabout and having therebeneath a gas mantle 42 for heating the interior of the kiln into which has been placed the bottle 11 after being spray coated, as just previously described.

Figure 6:
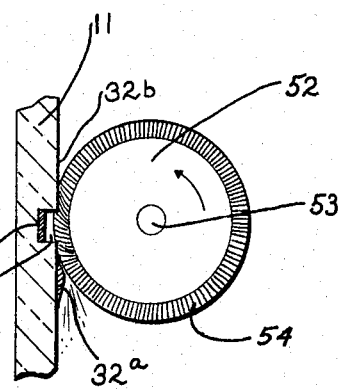
FIG. 6 is a schematic view, partly in section and in accordance with another intermediate step of the process of the invention.

Referring now to FIG. 6, the bottle 11 is shown enlarged in section. As can be seen, the recessed portion 12 bears a coating 50 of the applied precious metal decorating material. The area immediately below the recess 12 also bears decorating material 32a, which in accordance with the invention was dried by the kiln heating, as disclosed in the discussion of FIG. 5. On the other hand, the contiguous area 32b just above the recess 12 is devoid of the applied precious metal decorating coating by reason of the physical abrasion inflicted by the rotating buffing wheel 52, which rotates about shaft 53 connected to a motor in conventional fashion, but not shown herein. In accordance with this invention, care is taken in selection of the buffing wheel or device such that the deformable component of the brushing wheel, for example the stiff bristle 54, is of such character that it cannot penetrate into the innermost reaches of the recess 12. This avoids any removal of the applied decorative coating 50 within the recess.

From the buffing operation the glass article bearing the precious metal coating decoration only in the recessed portions of the glass article is reintroduced into the kiln 40, whereupon it is subjected to a temperature sufficient to bond or fuse the precious metal decorating material to the glass surface, or sufficient to cause a flux component of the precious metal decorating composition to bond or fuse to the glass substrate. Finally, the decorated glass article is cooled to approximately room temperature, either directly or after annealing in a lehr.

As indicated hereinabove, preferred coatings in accordance with the present invention are the precious metal containing coatings which form a metallic film when applied to various glass substrates and subsequently heated. By precious metal, I mean to include generally the following elements of metallic character, e.g. gold, platinum, palladium, osmium, iridium, ruthenium, rhodium, silver and copper. I have found that the precious metals embraced by the platinum family are preferred, and that gold and platinum are most preferred. The foregoing metals are preferably applied as generally liquid coatings in which the metal is contained in a compound, such as a resinate, mercaptide, alkyl mercaptide, cyclic terpene mercaptide, terpene mercaptan resinate, halogenometal mercaptide-alkyl sulfide complex and/or mixtures thereof. The liquid coatings include suitable fluxing agents to enhance metallic brilliance and adherence to the glass substrate. Also, the liquid coatings include suitable diluents and/or solvents, such as certain oil vehicles.

Successful practice of the present invention has been carried out, utilizing commercial gold decorating compositions composed of the gold salt-like materials, e.g. gold resinate together with suitable fluxing ingredient and a suitable carrying vehicle and/or diluent. One material which has been successfully employed is marketed by the Hanovia Division of Engelhard Industries, Inc., Newark, New Jersey, under the code designation Hanovia #8102. Another successfully used gold decorating composition is marketed by the E. I. du Pont de Nemours & Company of Wilmington, Delaware, and marketed under the code designation DuPont #5300. Precious metal and particularly gold decorating materials of the foregoing type are amply disclosed in, for example, U.S. Patents 2,490,399; 2,842,399; 2,984,575; 2,994,614; and 3,022,177.

Preferably in accordance with the present invention and to achieve uniformity of coverage, the precious metal liquid decorating coating, thinned with a suitable solvent to spraying viscosity, is applied by a spraying technique. I have achieved very satisfactory performance using a No. 2 Paasche spray gun including a head assembly (ARF-1) identified as Code A-AJAV-ARF, manufactured by the Paasche Air Brush Company of 1909 Diversey Parkway, Chicago 14, Illinois. After being sprayed as just described, the glass article will bear a deposition of the coating in the recessed areas and as well on areas immediately contiguous thereto. This coating, including the precious metal in the form of a resinate or mercaptide, will be quite tacky. Accordingly, I prefer to subject it to a heating step and, for example, a furnace or a kiln, such as shown in FIG. 5, wherein the temperature is maintained at 650° F. or higher, and preferably in the range of from about 700° F. to 850° F. Exposure to this temperature range for from about five to about ten minutes converts the decorating composition to a non-tacky state, but does not cause any fusion of the flux component. Accordingly, thereafter the hardened coating is removed by a buffing operation as hereinabove described. Preferably, the coated article is cooled to room temperature before buffing. After the buffing operation, wherein the decorating precious metal coating has been removed from the contiguous areas, but without disturbing the coating in the recessed areas, the bottle or glass article is reintroduced into a kiln or furnace, such as that disclosed above in FIG. 5, whereupon it is exposed to a temperature ranging from about 1050° F. to about 1250° F. Preferably, in order to insure good adherence of the precious metal decorating materials, the temperature should be at least about 1150° F.

When the glass article to be decorated is formed of a borosilicate glass, the final heating step may be somewhat higher approaching the range of 1350° F. to 1400° F. without any deleterious effect, although these temperatures must be avoided in the conventional soda-lime glasses.

In place of a buffing wheel 52, as described hereinabove, there may be beneficially employed a buffing belt carried on spaced drums or pulleys, one of which is driven to move the belt at a desired rate of speed. In this arrangement the decorated article can be brought into contact with the belt intermediate the spaced supporting drums or pulleys, thereby bowing the belt inwardly, thus increasing somewhat the area of contact and the efficiency of removal of the applied decoration from the areas adjacent the recessed lettering and/or decoration. When utilizing the belt buffing technique as described hereinabove, it is most preferable that the belt, fabricated of either textile or leather, be maintained in a slightly moist condition. Care, on the other hand, must be exercised that the belt is not wet since this will frequently cause a spattering of moisture or water into the recessed portion which spots the precious metal decorating coating upon ultimate fusion or firing.

From the foregoing description, it can be seen that I have disclosed a novel, yet extremely simple, process for decorating a glass article with a decorating composition, particularly a precious metal-containing coating which process inherently yields its brilliant and precious metal coating in a recessed and, therefore, protected area. The process is very adaptable to a continuous technique, while at the same time the process is flexible in that it can be carried out stepwise or batchwise as well, depending upon the volume of articles to be produced of a given design.

Modifications may be resorted to without departing from the spirit or scope of the invention, as defined in the appended claims.

I claim:
1. The method of enchancing a design including decorations and lettering recessed in a glass bottle which comprises: applying a coating comprising a precious metal salt-like component and a flux component to said recessed portions and the areas immediately contiguous thereto in order to insure complete coverage of said recessed portions, said coating being formable of a metallic film deposit on heating and being bondable to glass by fusion of said flux, heating said article and coating to a temperature sufficient to dry said coating to a non-tacky state, said temperature being less than that which would materially fuse said flux component, selectively buffing said non-tacky but unfused flux containing coating from said adjoining areas, and heating said selectively coated article to a temperature sufficient to fuse and bond said flux and metal to said glass.

2. The method as claimed in claim 1, wherein said article bearing the coating is cooled to approximately room temperature after the first heating step.

3. The method as claimed in claim 1, wherein said coating includes a component selected from the group consisting of metal resinates, metal mercaptides, metal alkyl mercaptides, metal cyclic terpene mercaptides, terpene mercaptan metal resinates and halogenoplaninous mercaptide-alkyl sulfide complexes and mixtures thereof.

4. The method as claimed in claim 3, wherein the metal is selected from the group gold and platinum.

References Cited by the Examiner
UNITED STATES PATENTS

| | | | |
|---|---|---|---|
| 1,494,630 | 5/1924 | Reizenstein | 117—8 |
| 1,640,076 | 8/1927 | Hart | 65—60 |
| 1,852,759 | 4/1932 | Shaw et al. | 117—8.5 |
| 2,002,900 | 5/1935 | Leibig | 215—1 |
| 2,374,356 | 4/1945 | Keuffel et al. | 117—10 |
| 2,916,393 | 12/1959 | Veloris | 117—8 |
| 2,994,614 | 8/1961 | Fitch | 106—1 |
| 3,022,177 | 2/1962 | Fitch | 106—1 |

MURRAY KATZ, *Primary Examiner.*

RICHARD D. NEVIUS, *Examiner.*

R. E. ZIMMERMAN, A. H. ROSENSTEIN,
*Assistant Examiners.*